United States Patent [19]
Nelson

[11] Patent Number: 5,337,788
[45] Date of Patent: Aug. 16, 1994

[54] PNEUMATIC VALVE WITH SLOW START AND QUICK EXHAUST

[75] Inventor: John Nelson, Durham, N.H.

[73] Assignee: Robertshaw Controls Company, Richmond, Va.

[21] Appl. No.: 141,854

[22] Filed: Oct. 22, 1993

[51] Int. Cl.$^5$ .............................. F16K 31/122
[52] U.S. Cl. ...................... 137/627.5; 137/629
[58] Field of Search ................ 137/629, 627.5

[56] References Cited

U.S. PATENT DOCUMENTS

| | | |
|---|---|---|
| 2,129,938 | 9/1938 | Johnson . |
| 3,458,769 | 7/1969 | Stampfli . |
| 3,460,798 | 8/1969 | Carsten . |
| 3,473,570 | 10/1969 | Herion . |
| 3,742,984 | 7/1973 | Wilkins .................. 137/629 |
| 3,801,063 | 4/1974 | Holmes et al. . |
| 4,519,422 | 5/1985 | Cohen . |
| 4,615,354 | 10/1986 | Bianchi ................... 137/629 X |
| 4,624,441 | 11/1986 | Kreitchman et al. . |
| 4,799,645 | 1/1989 | Kramer et al. . |
| 4,921,208 | 5/1990 | LaMarca . |

Primary Examiner—Robert G. Nilson
Attorney, Agent, or Firm—Fish & Richardson

[57] ABSTRACT

A pneumatic valve that has slow start and quick exhaust features and includes a housing structure defining a main flow passage between a supply inlet and a system outlet and a by-pass flow passage around a main valve in the main flow passage, a control valve that controls flow through the by-pass flow passage, an adjustable restriction in the by-pass flow passage, and an exhaust valve member that opens or closes an exhaust opening to the main flow passage.

19 Claims, 1 Drawing Sheet

PNEUMATIC VALVE WITH SLOW START AND QUICK EXHAUST

BACKGROUND OF THE INVENTION

The invention relates to pneumatic valves.

In some applications for pneumatically actuated equipment, it is desirable for pneumatic control valves used to connect and disconnect a source of compressed air to the equipment to have a slow start characteristic, meaning that there is a gradual increase in pressure when first turned on. It is known in the prior art to adjust the rate of increase of pressure during the slow start period through the use of a needle valve. In some applications it is also desirable to have quick exhaust of the system pressure when a valve has been turned off. The combined features of slow start and quick exhaust have been provided by using a slow start valve with a quick exhaust valve or by constructing a combination valve that has both features built in to it.

SUMMARY OF THE INVENTION

The invention features, in general, a pneumatic valve having slow start and quick exhaust features. The valve includes a housing structure defining a main flow passage between a supply inlet and a system outlet and a by-pass flow passage around a main valve in the main flow passage. A control valve controls flow through the by-pass flow passage to permit a gradual increase in downstream, system pressure to protect pneumatic equipment from being actuated too quickly. The increased downstream pressure acts on downstream surfaces of the main valve to move the valve to an open position after a predetermined downstream pressure has been reached. The by-pass flow passage has an adjustable restriction (e.g., a needle valve) to permit the user to adjust the rate of increase of system pressure depending upon the equipment and desired operation. The valve also has an exhaust valve member that opens or closes an exhaust opening to the main flow passage to provide quick exhaust of the system pressure when turned off.

In preferred embodiments, the exhaust valve opening is directed downward. Both the exhaust valve member and the control valve are actuated by connecting or disconnecting air pressure supplied at the supply inlet; the exhaust valve member and the control valve both have surfaces exposed to pressure in chamber means in the housing structure, and increased air pressure in the chamber means biases the exhaust valve member to a position in which the exhaust opening is closed and also biases the control valve to a position permitting flow through the by-pass flow passage. The control valve is a spool valve that is coaxially mounted around a piston of the exhaust valve member in the same chamber in the housing structure. The exhaust opening preferably goes through the main valve. A spring urges the main valve toward the blocked position and deflects in response to increased pressure on the downstream surface of the main valve and force applied by the exhaust valve member on the main valve, permitting movement of the main valve toward the unblocked position. A second spring pushes the exhaust valve member to a position in which the exhaust opening is open when the pressure in the chamber is reduced. The spring characteristics and the areas of surfaces exposed to air pressure so as to bias the exhaust valve member and the main valve are such that the forces tending to move the main valve to an open position overcome the forces tending to move the main valve to the closed position when the downstream pressure exceeds a value that is between 40% and 80% (preferably between 50% and 70%, and most preferably about 60%) of the upstream pressure. The exhaust valve member has a surface that communicates with the main flow passage downstream of the main flow valve, and increased pressure on this surface tends to urge the exhaust valve member to open the exhaust opening.

Other advantages and features of the invention will be apparent from the following description of the preferred embodiment thereof and from the claims.

DESCRIPTION OF THE PREFERRED EMBODIMENT

Figure 3:
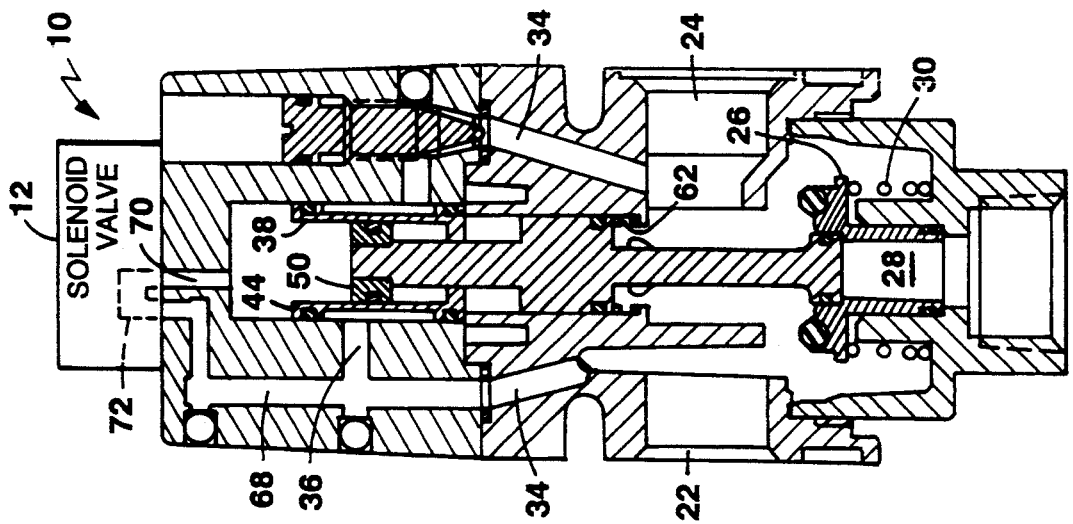
FIGS. 2 and 3 are partially diagrammatic vertical sectional views of the FIG. 1 valve in different positions.
Figure 2:
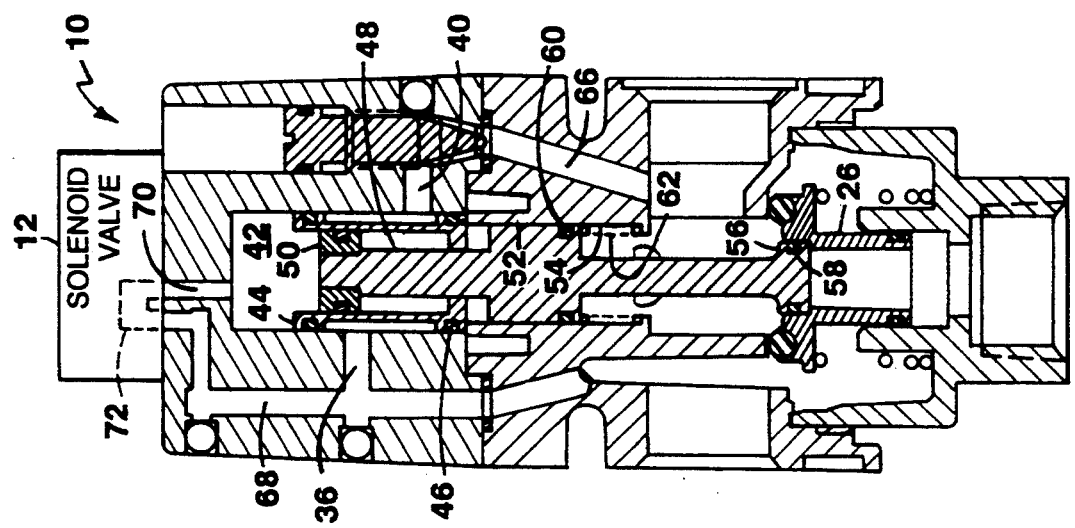
Figure 1:
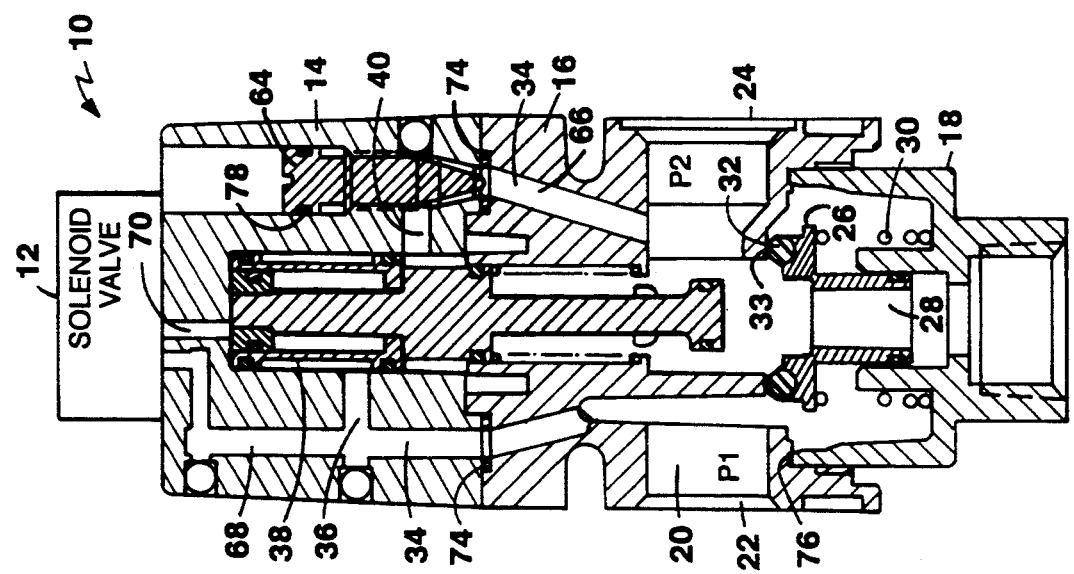
FIG. 1 is a partially diagrammatic vertical sectional view of a pneumatic valve according to the invention.

Referring to the FIGS. 1-3, there is shown pneumatic valve 10 which has slow start and quick exhaust features. Attached to valve 10 is solenoid valve 12, shown diagrammatically in the drawings with the indicated flow paths for its closed (FIG. 1) and open (FIGS. 2 and 3) states. Valve 10 has a housing structure provided by three blocks, upper block 14, middle block 16, and lower block 18.

Main flow passage 20 from supply inlet 22 to system outlet 24 is defined within middle block 16 and lower block 18. Main valve 26 is slidably mounted on lower block 18 and moves between a closed position in which main flow passage 20 is blocked (FIGS. 1 and 2) and an open position in which main flow passage 20 is unblocked (FIG. 3). Main valve 26 has exhaust opening 28 therethrough and is biased upward via spring 30 and supply air pressure. Opening 28 is desirably large and directed downward in order to exhaust downward as opposed to sideways. The upper surface of main valve 26 carries sealing ring 32 that seals against main valve seat 33 formed within middle block 16.

By-pass flow passage 34 is defined by upper block 14 and middle block 16 and extends from supply inlet 22 (upstream of main valve 26) to system outlet 24 (downstream of main valve 26). By-pass flow passage 34 extends upward from supply inlet 22 and then travels horizontally in passage segment 36 to spool valve 38, which controls flow through by-pass passage 34. By-pass passage continues horizontally through passage segment 40 to needle valve 64, and from there downward through passage segment 66 to system outlet 24.

Spool valve 38 is in a closed position in FIG. 1, blocking flow from passage segment 36 to passage segment 40. Spool valve 38 is shown in the open position in FIGS. 2 and 3; in this position, by-pass flow passage 34 wraps around the outside of spool valve 38 from passage segment 36 to passage segment 40. Spool valve 38 is slidably mounted within cylindrical chamber 42 and includes sealing rings 44, 46 to make an airtight seal with the inner surface defining chamber 42.

Exhaust valve member 48 includes piston 50 within spool valve 38, midsection 52 sliding within cylindrical chamber 54 in middle block 16, and lower exhaust valve 56 25 having sealing ring 58 for sealably closing exhaust opening 28 through main valve 26 (e.g., as shown in FIGS. 2-3). Midsection 52 includes sealing ring 60 and is biased upward via spring 62.

Needle valve 64 provides an adjustable restriction between passage segment 40 and passage segment 66 along the length of by-pass passage 34. Needle valve 64 is threaded within block 14 and carries sealing ring 78 to seal off the opening to by-pass passage 34.

At the top of block 14, passage extension 68 from by-pass passage 34 communicates with solenoid valve 12 as does passage 70 to the top of chamber 42. In place of solenoid valve 12, another type of valve such as an air pilot manually operated valve, can be used. When solenoid valve 12 is in a closed position, passage extension 68 and passage 70 are isolated from each other. When solenoid valve 12 is open, it provides passage 72 that connects passage extension 68 with passage 70.

Sealing rings 74 provide a seal around by-pass passage 34 at the junction between blocks 14 and 16. Sealing ring 76 similarly provides a seal between block 16 and block 18, which are threadedly connected to each other.

OPERATION

In operation, supply inlet 22 is connected to a source of compressed air at pressure P1; system outlet 24 is connected to pneumatic equipment being controlled by valve 10, and solenoid valve 12 controls the supply of compressed air by valve 10 to the equipment. Table 1 describes the positions of the valves and the inlet and outlet pressures during operation in the three positions shown in FIGS. 1-3.

TABLE 1

|  | FIG. 1 | FIG. 2 | FIG. 3 |
| --- | --- | --- | --- |
| Solenoid Valve 12 | Closed | Open | Open |
| Main Valve 26 | Closed | Closed | Open |
| Exhaust Valve 56 | Open | Closed | Closed |
| Needle Valve 64 | Open | Open | Open |
| Inlet Pressure | P1 | P1 | P1 |
| Outlet Pressure | P2 = 0 | $0 < P2 < .6P1$ | $.6P1 < P2 \leq P1$ |

In FIG. 1 both solenoid valve 12 and main valve 26 are closed, and therefore the outlet pressure, P2, is equal to zero. In this position, any pressure on the outlet side of valve 10 exhausts to zero through exhaust opening 28.

In FIG. 2, solenoid valve 12 has been energized, allowing air at the supply pressure, P1, to flow from passage extension 68 through passage 72 in solenoid valve 12 and from there through passage 70 into chamber 42. Air pressure in chamber 42 acts downward against the upper surface of piston 50 and upper surface 44 of valve spool 38. Exhaust valve member 48 moves downward against spring 62, and exhaust valve 56 at the bottom of member 48 closes exhaust opening 28 through main valve 26. At the same time, valve spool 38 shifts downward, allowing air to flow in by-pass flow passage 34 from the upstream side of main valve 26 to the downstream side of main valve 26. The position of needle valve 64 controls the rate of flow in passage 34 and thus the rate of increase of pressure P2 in the system downstream. Valve 10 remains in the position shown in FIG. 2 until P2 increases to about 60% of supply pressure P1.

In FIG. 3, valve 10 is shown after P2 has increased to a value greater than 60% of P1. The combination of forces generated by P1 acting on exhaust valve piston 50 and P2 acting on the upper, downstream surfaces of main valve 26 is sufficient to open main valve 26 against spring 30 and the upward forces of acting on main valve 26 by P1 acting on the lower surfaces thereof and upward forces on member 48 by P2 and spring 62. When this happens, main valve 26 moves downward to the position shown in FIG. 3. At this time, system pressure P2 immediately increases to the value of P1, and valve 10 is in its normal operating position. The strength of springs 30 and 62, the area of the upper surface of piston 50, and the size of surfaces of exhaust valve member 48 and main valve 26 that are exposed to P2 and have normal vectors with a component aligned with the vertical sliding axes of member 48 and main valve 26 are selected to provide the crossover point at 60% of P1.

The slow ramp-up is used to avoid uncontrolled movement of cylinders in pneumatic equipment connected to system outlet 24. By adjusting needle valve 64, the user can set the rate of ramp-up for the particular pneumatic equipment being controlled and the desired performance. The cylinders in such equipment will, in most instances, have already been actuated when the pressure is 0.6 of supply pressure, and at that point it is safe, and desirable, to quickly increase the pressure to the line pressure.

When solenoid valve 12 is deenergized, piston 52, no longer exposed to pressure P1 in chamber 42, moves upward, owing to the combined force of spring 62 and P2 acting on the lower surface of midsection 52. With exhaust valve 56 raised, system pressure P2 rapidly decreases to zero as the air is dumped through exhaust opening 28. At the same time, valve spool 38 is raised back to its original position as it is carried by midsection 52 of exhaust valve member 48, closing off the flow through by-pass passage 34; main valve 26 moves upward due to force of spring 30 and P1 acting on the underside, to close the main valve opening. Valve 10 is then in the inoperative position shown in FIG. 1.

Other embodiments of the invention are within the scope of the appended claims.

What is claimed is:

1. A slow start and quick exhaust pneumatic valve comprising
    a housing structure defining a supply inlet, a system outlet and a main flow passage between said supply inlet and said system outlet,
    a main valve movably mounted in said housing structure for movement between a closed position in which said main flow passage is blocked and an open position in which said main flow passage is unblocked,
    said main valve being urged to said open position by increased pressure on downstream surfaces of said main valve,
    said housing structure defining a by-pass flow passage from a location on said main flow passage upstream of said main valve to a location on said main flow passage downstream of said main valve,
    a control valve controlling flow through said by-pass flow passage,
    an adjustable restriction in said by-pass flow passage, and
    an exhaust valve member that opens or closes an exhaust opening to said main flow passage.

2. The valve of claim 1 wherein said exhaust opening is directed downward.

3. The valve of claim 2 wherein said exhaust opening is directed downward.

4. The valve of claim 1 wherein said control valve has a surface in a chamber means in said housing structure, said exhaust valve member has a first surface in said chamber means, said chamber means being selectively connected to be pressurized by air pressure supplied at said supply inlet, increased air pressure in said chamber means acting on said surface of said control valve and said first surface of said exhaust valve member to bias said exhaust valve member to a position in which said exhaust opening is closed and to bias said control valve to a position permitting flow through said by-pass flow passage.

5. The valve of claim 4 wherein said control valve and said exhaust valve are coaxially mounted in the same chamber in said housing structure.

6. The valve of claim 5 wherein said exhaust valve member has a piston on one end and an exhaust valve that closes said opening on the other end, and wherein said control valve is a spool valve that surrounds said piston.

7. The valve of claim 6 wherein said exhaust valve member has a second surface communicating with said main flow passage downstream of said main flow valve, increased pressure on said second surface tending to urge said exhaust valve to open said exhaust opening and to move said control valve to a position in which said by-pass flow passage is blocked.

8. The valve of claim 1 further comprising a spring that urges said main valve toward said closed position and deflects in response to increased pressure on said downstream surface of said main valve, permitting movement of said main valve toward said open position.

9. The valve of claim 8 wherein said exhaust opening is through said main valve.

10. The valve of claim 9 wherein said exhaust valve member is slidably mounted along an axis that is transverse to the direction of flow into said supply inlet and is transverse to the direction of flow out of said system outlet.

11. The valve of claim 9 wherein said exhaust valve member has a first surface in said chamber means, said chamber means being selectively connected to be pressurized by air pressure supplied at said supply inlet, increased air pressure in said chamber means acting on said first surface of said exhaust valve member to bias said exhaust valve member to a position in which said exhaust opening is closed.

12. The valve of claim 11 wherein said main valve has a surface that said exhaust valve contacts in said closed position of said exhaust opening, said increased pressure on said first surface causing said exhaust valve member to push said main valve member toward said open position in conjunction with said air pressure acting on said downstream side of said main valve member and against the force of said spring and pressure from said supply inlet acting on the upstream surface of said main valve member.

13. The valve of claim 12 further comprising a second spring tending to push said exhaust valve member to a position in which said exhaust opening is open.

14. The valve of claim 12 wherein spring characteristics and the areas of surfaces exposed to air pressure so as to bias said exhaust valve member and said main valve are such that the forces tending to move said main valve to an open position overcome the forces tending to move said main valve to said closed position when the downstream pressure exceeds a value that is between 40% and 80% of said upstream pressure.

15. The valve of claim 14 wherein said value is between 50% and 70% of said upstream pressure.

16. The valve of claim 12 wherein said exhaust valve member has a second surface communicating with said main flow passage downstream of said main flow valve, increased pressure on said second surface tending to urge said exhaust valve to open said exhaust opening.

17. The valve of claim 12 wherein said exhaust opening is directed downward.

18. The valve of claim 9 wherein said exhaust opening is directed downward.

19. The valve of claim 1 wherein said adjustable restriction is a needle valve.

* * * * *